Patented Jan. 22, 1952

2,582,991

UNITED STATES PATENT OFFICE 2,582,991

METHOD OF FORMING A SPRAYABLE SYNTHETIC RUBBER SOLUTION

Charles Henry Hempel, Manitowoc, Wis., assignor to Heresite & Chemical Company, a corporation of Wisconsin No Drawing. Application December 11, 1948, Serial No. 64,908

2 Claims. (Cl. 260—33.6)

This invention relates to a process by which polymerizates and copolymerizates, composed of butadiene, its homologues, halogen substitutes, alone or mixed together, or in mixtures with other compounds, polymerizable under the action of catalysts, may be dissolved and thereafter employed as a protective coating. The invention is particularly applicable to polymerizates of the butadiene-styrene, and butadiene-acrylonitrile type, which are here designated as rubbery butadiene copolymers.

This application is a continuation-in-part of my now abandoned application, filed August 2, 1946 as Serial No. 687,967, which in turn was a continuation-in-part of my then copending application filed April 28, 1945 as Serial No. 590,955 and now abandoned.

Up to the time of this invention rubber-like copolymers of butadiene and styrene and butadiene and acrylonitrile were not satisfactorily soluble in any solvent. I have discovered a process for preparing a copolymer and mixing it with certain pigments, accelerators, and activators, whereby the polymerizate becomes readily soluble in an aromatic hydrocarbon solvent of the type hereinafter to be described. The solvent being volatile, and the solution being of low viscosity, the product may be sprayed, or the product may be coated therewith by dipping, slushing, or other methods, and the resulting coating is immune to substantially all known chemicals. When spraying, four separately applied and fixed coats are generally required to produce a thickness of about .016". In dipping and slushing about eight coats are required to reach the same thickness.

Such a process is particularly suitable for the treatment of the inner walls of tank cars to be employed for the shipment of sulfuric acid, sodium hydroxide solution, formic acid, chromic acid, and other similar materials of highly corrosive nature. Likewise, the spray is of particular value in the spraying of inner portions of the acid pumps and filter press plates used in filtering viscose in rayon and cellophane manufacturing processes.

Natural rubber has heretofore been employed for such purposes, but synthetic rubber lining is considerably superior thereto in its chemical and heat resistance. Furthermore, natural rubber cannot be sprayed on in this manner, but must be applied in sheets.

In applying the coating, it is necessary to prepare the metal surface to be coated by sandblasting or a suitable acid etch to obtain proper adhesion.

In preparing the synthetic rubber, the polymerization requires a substantial period of time, in the neighborhood of 24 hours. Under ordinary methods of preparing the copolymers, that part of the butadiene copolymerizing during the early part of the process appears to go through stages of increasing insolubility, and become increasingly difficult to plasticize. Apparently changes somewhat analogous to the changes in resins from A to B to C stage occur, and copolymer first formed normally progresses to a more advanced stage than that later formed. I have found that the addition of a minor proportion of cyclohexane or benzol, maintains substantially all the copolymers in a state of ready and substantially equal solubility and ability to be plasticized.

The preferred formula for a butadiene-styrene copolymer is as follows:

75 parts butadiene
25 parts styrene
120 parts water
14 parts soap
1 part sodium hydroxide
2 parts potassium persulfate
15 parts benzol Acrylonitrile may be substituted for the styrene if Buna-N rubber is desired. Sodium persulfate may be substituted for the potassium persulfate, and cyclohexane may be substituted for the benzol. Any alkali metal hydroxide may be used in place of the sodium hydroxide, such as potassium hydroxide.

While the modifier, such as cyclohexane, or benzol, is shown in the above formula as 15 parts, the amount may be anywhere between 10 and 20 parts. The formula may be further varied within the following limits:

Butadiene—50 to 90 parts
Styrene (or acrylonitrile)—10 to 50 parts
Water—100 to 140 parts
Soap—2 to 15 parts
Sodium hydroxide—0.2 to 2.0 parts
Potassium persulfate—0.1 to 4.0 parts In carrying out the process, a solution of common soap is made by adding soap in the proportion designated to warm water and agitating vigorously until the soap is completely dissolved and the solution is cooled. To this is added the styrene (or acrylonitrile), the styrene having been extracted with sodium hydroxide solution to remove the inhibitor, and the mixture is again agitated vigorously for about ten minutes. Then the sodium hydroxide, potassium persulfate, and benzol are added together and agitated for about fifteen minutes. This emulsion is pumped into a pot equipped with an efficient agitator and built to withstand the required pressure. The pot is also equipped with a pressure gauge and a thermometer. To this is added the butadiene, and the mixture under agitation is heated. The temperature should be held carefully between 36° C. and 40° C. The pot is closed and the above temperatures will generate a pressure within the pot of about 45 pounds per square inch, the particular pressure generated depending upon the temperature and somewhat on the reacting ingredients. The pressure will drop to zero in about 23 hours, signifying the completion of the reaction. Upon completion of the reaction, a white liquid is obtained which may be called a latex milk, as it looks similar to caoutchouc latex. The latex is then either coagulated directly, such as by a 15% hydrochloric acid solution, or may be masterbatched with pigment in an aqueous dispersion and then coagulated. In either event after coagulation, the coagulate is washed, dried and then compounded with more pigments (if necessary), vulcanizing agents, accelerators, plasticizers, and activators. After compounding, the mixture is then dissolved in an aromatic hydrocarbon solvent such as benzene or aliphatic substituted benzenes with each of the substituents having from 1 to 4 carbon atoms and the solvent having a boiling point between 80° C. and 200° C. The dissolution in the solvent is effected by efficient agitation and, after complete solution, the mixture is ready for spraying.

As specific examples of solvents, the following may be used: Benzene, methyl benzene (toluene), ethyl benzene, 1,2 dimethyl benzene (o-xylene), 1,3 dimethyl benzene (m-xylene), 1,4 dimethyl benzene (p-xylene), normal propyl benzene, isopropyl benzene, normal butyl benzene, secondary butyl benzene or tertiary butyl benzene.

The activators may be zinc oxide, magnesium oxide, litharge or calcium oxide, and examples of plasticizers usable in the process are pine tar, mineral oil, castor oil, rosin oil, tricresyl phosphate or dioctyl phthalate.

Any finely divided pigment which is inert to the solution may be used, such as carbon black, lampblack, silica, ochre, sienna, calcium silicate, magnesium silicate, titanium dioxide, clay, iron oxide, mica, talc, lithopone, barium sulfate or calcium sulfate.

The vulcanizing agent is preferably sulfur and the accelerators may be 2-mercaptobenzothiazole 2,2′ benzothiazyl disulfide, zinc dimethyl dithiocarbamate, zinc diethyl dithiocarbamate, selenium dimethyl dithiocarbamate or selenium diethyl dithiocarbamate.

The critical limits for the ingredients used in the sprayable mixture are as follows:

|  | Parts by weight |
|---|---|
| Copolymerizate | 100 to 150 |
| Pigment | 50 to 200 |
| Plasticizer | 2 to 25 |
| Vulcanizer | 5 to 40 |
| Activator | 1 to 5 |
| Accelerator | 2 to 10 |
| Solvent | 200 to 500 |

Coatings of prepared material are allowed to air dry for 30 to 60 minutes and then are subjected to a temperature of approximately 100° C. for 10 minutes. The time and temperature may be varied to produce a surface which is completely dry and free of solvent before the application of a second coat. Multiple coatings may be applied in the manner just described and form a uniform coating which is free from porosity and pin holes and possesses a very high corrosion chemical resistance.

The process of forming a coating of synthetic rubber described herein is not reversible and a coating once applied and dried is thereafter insoluble in an aromatic hydrocarbon solvent of the type described herein.

While I have shown and described certain embodiments of my invention, it is to be understood that it is capable of many modifications. Changes, therefore, in the construction and arrangement may be made without departing from the spirit and scope of the invention as disclosed in the appended claims.

I claim:

1. In a method of forming a sprayable synthetic rubber solution which includes copolymerizing under heat and pressure 50 to 90 parts by weight of butadiene with 10 to 50 parts by weight of a material copolymerizable therewith of the class consisting of styrene and acrylonitrile in the presence of from 10 to 20 parts by weight of a modifier chosen from the class consisting of benzol and cyclohexane, and coagulating the copolymerizate, the steps which comprise mixing with 100 to 150 parts by weight of the coagulated copolymerizate, 50 to 200 parts by weight of a finely divided inert pigment, 2 to 25 parts by weight of a plasticizer, 5 to 40 parts by weight of sulfur, 1 to 5 parts by weight of an activator, and 2 to 10 parts by weight of an accelerator, and then dissolving the mixture in 200 to 500 parts by weight of an aromatic hydrocarbon solvent therefor having a boiling point of between 80° C. and 200° C. and chosen from the class consisting of benzene and aliphatic substituted benzene with each of the substituents having from 1 to 4 carbon atoms.

2. In a method of forming a sprayable synthetic rubber solution which includes mixing 50 to 90 parts by weight of butadiene with 10 to 50 parts by weight of a material copolymerizable therewith of the class consisting of styrene and acrylonitrile, heating the mixture in a closed zone to a temperature between 36° C. and 40° C. under a self-generated pressure and in the presence of from 10 to 20 parts by weight of a modifier chosen from the class consisting of benzol and cyclohexane, maintaining the mixture at said temperature until the pressure drops to zero to form a copolymerizate, and coagulating the copolymerizate, the steps which comprise mixing with 100 to 150 parts by weight of the coagulated copolymerizate, 50 to 200 parts by weight of a finely divided inert pigment, 2 to 25 parts by weight of a plasticizer, 5 to 40 parts by weight of sulfur, 1 to 5 parts by weight of an activator, and 2 to 10 parts by weight of an accelerator, and then dissolving the mixture in 200 to 500 parts by weight of an aromatic hydrocarbon solvent therefor having a boiling point of between 80° C. and 200° C. and chosen from the class consisting of benzene and aliphatic substituted benzene with each of the substituents having from 1 to 4 carbon atoms.

CHARLES HENRY HEMPEL.

REFERENCES CITED

The following references are of record in the file of this patent:

UNITED STATES PATENTS

| Number | Name | Date |
|---|---|---|
| 2,467,382 | Hempel | Apr. 19, 1949 |

OTHER REFERENCES

Koch—"Buna Rubbers"—Ind. & Eng. Chem. April 1940 vol. 32 No. 4 (pages 464–467).